Aug. 18, 1931.  W. J. LUFF  1,819,253
TRAP
Filed March 5, 1929
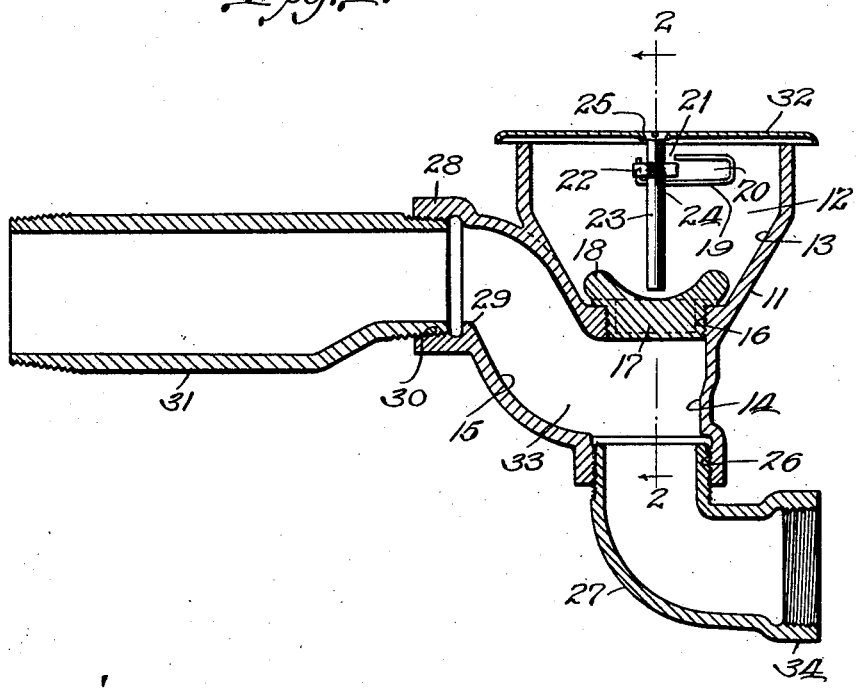
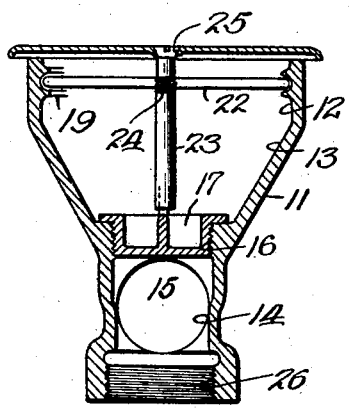
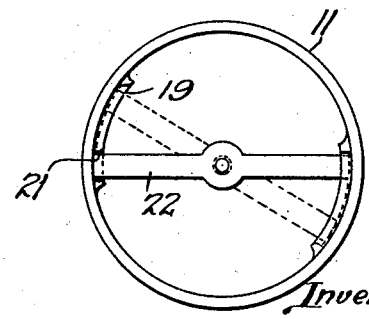
Inventor
Willard J. Luff
By Fay, Oberlin & Fay
Attorneys Patented Aug. 18, 1931

1,819,253

UNITED STATES PATENT OFFICE

WILLARD J. LUFF, OF CLEVELAND HEIGHTS, OHIO

TRAP

Application filed March 5, 1929. Serial No. 344,236.

The present application relates, as indicated, to traps, and the primary object of the invention is to provide a trap which shall be inexpensive, highly efficient, substantially self-cleaning, and adjustable to a wide extent. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a central vertical section through a trap constructed according to the present invention and having inlet and outlet leads attached thereto; Fig. 2 is a vertical section taken substantially upon the line 2—2 of Fig. 1; and Fig. 3 is a plan view of the trap with the cover plate removed.

Referring more particularly to the drawings, it will be seen that the trap comprises a body member 11 formed to provide a chamber 12, the walls of which are tapered inwardly near the bottom as at 13. The body member further provides a second chamber 14 of much smaller diameter and located immediately below and concentric with the chamber 12. An outlet conduit 15 integrally formed in the body member opens at 33 into the chamber 14, and it may here be noted that the height of the chamber 14 is substantially equal to the diameter of the conduit 15. The chambers 12 and 14 may communicate through a clean-out port 16 adapted normally to be closed by a plug 17 which may be provided with wings 18 to facilitate the rotation thereof, it being noted that the plug 17 is preferably threaded into the port 16.

Adjacent the open upper end of the chamber 12, the body member 11 is interiorly formed with a pair of ribs 19 formed to provide a slot 20 having an opening 21 in its upper wall. A bar 22 is adapted to have its opposite ends entered in the slots 20 through the openings 21, so that the same may be secured in position in the upper end of the chamber 12 by a slight rotation. Said bar is provided with an aperture at its center, said aperture being internally threaded for cooperation with threads 24 formed on a member 23. Said member 23 is adapted to be passed through an aperture 25 in a cover member 32, and then to be screwed in place in the bar 22 to retain said cover in position closing the open upper end of the chamber 12.

The bottom wall of the body member 11 is formed with an inlet port 26 which is internally threaded for the reception of a pipe section 27 which may take the form of an elbow, as illustrated, or which may be any other curved pipe section. It will be noted that the shoulder on the pipe section 27 is so located as not to interfere with rotational adjustment of the pipe section 27 with respect to the body member 11. As is obvious from Fig. 1, the free end 28 of the outlet conduit 15 is disposed at a level considerably above that of the chamber 14, the lowest point 29 of said end being located just above the point at which the clean-out port 16 communicates with said chamber 14. Said end 28 is internally threaded as at 30 for the reception of an eccentric pipe section 31. As will be obvious, said section may be rotated upon its own axis to adjust the level of the free end thereof.

As has been indicated, the present structure can be installed in a multiplicity of different positions with respect to the fixture to which it is to be attached and the waste stack, adjustments being made by rotating the pipe sections 27 and 31. One of the important features of the present invention lies in the fact that the passage through the fitting is substantially uniform in diameter from the inlet end 34 of the pipe section 27 to the free end 28 of the outlet conduit 15. This feature prevents the creation of stagnant pools or of pockets in which sediment or floating impurities might collect. It will be noted that the internal diameters of the pipe section 27, the chamber 14, the outlet conduit 15, and the clean-out port 16 are substantially equal. Another important feature of the invention lies in the fact that the lower end of the port 16 is disposed at a level lower than the point 29, whereby the port 16 is maintained always sealed, even if the plug 17 is left out of the port either through inadvertence, or through loss or breakage of said plug.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A trap comprising a body member formed to provide a chamber provided with a bottom inlet port, an outlet conduit at right angles thereto, a clean-out port aligned with said inlet port and of substantially equal diameter thereto, said clean-out port having its lower end opening into said chamber below the level of the highest point of the bottom wall of said outlet conduit and having its upper end above said level, and the diameter of said chamber being substantially equal to the diameter of said inlet port.

2. A trap comprising a body member formed to provide a chamber provided with an inlet port, an outlet conduit, and a clean-out opening having vertically spaced horizontal top and bottom edges, said top edge being above the level of the highest point of the bottom wall of said outlet conduit and said bottom edge being below said level, the diameter of said chamber, inlet port, and outlet conduit being substantially equal.

3. A fitting of the character described comprising an integral body member formed to provide a chamber having an internally threaded inlet opening in its bottom wall adapted adjustably to receive a curved pipe section of a diameter substantially equal to the diameter of said chamber, said body member providing further an enlarged clean-out chamber above said first-mentioned chamber and a clean-out port providing communication between said chambers, said body further being formed to provide an outlet conduit opening at one end into said first-mentioned chamber and having the lowest point of its opposite end disposed above the level of the bottom of said clean-out opening, but below the level of the top thereof.

4. A plumbing fitting comprising a principal member and pipe connections, said principal member comprising an integral body member formed to provide a chamber having an internally threaded inlet opening in its bottom wall adapted adjustably to receive a curved pipe section of a diameter substantially equal to the diameter of said chamber, said body member providing further an enlarged clean-out chamber above said first-mentioned chamber and a clean-out port providing communication between said chambers, said body further being formed to provide an outlet conduit opening at one end into said first-mentioned chamber and having its discharge end disposed above the level of the bottom of said clean-out opening but below the level of the top thereof, and said pipe connections including an eccentric pipe section adjustably secured to said discharge end of said outlet conduit.

Signed by me this 16th day of February, 1929.

WILLARD J. LUFF.